United States Patent
Heuchert et al.

(10) Patent No.: US 8,348,111 B2
(45) Date of Patent: *Jan. 8, 2013

(54) SYSTEM AND METHOD FOR VEHICLE ARTICLE CARRIER HAVING STOWABLE CROSS BARS

(75) Inventors: John M. Heuchert, Pontiac, MI (US); Eric Weber, Pontiac, MI (US); Michael R. Makin, Pontiac, MI (US); Gerald L. Drumm, Pontiac, MI (US); Gordon Michie, Lasalle (CA)

(73) Assignee: JAC Products, Inc., Saline, MI (US)

( * ) Notice: Subject to any disclaimer, the term of this patent is extended or adjusted under 35 U.S.C. 154(b) by 295 days.

This patent is subject to a terminal disclaimer.

(21) Appl. No.: 12/755,044

(22) Filed: Apr. 6, 2010

(65) Prior Publication Data

US 2010/0252595 A1    Oct. 7, 2010

Related U.S. Application Data

(63) Continuation-in-part of application No. 12/637,907, filed on Dec. 15, 2009, now Pat. No. 8,235,264, which is a continuation-in-part of application No. 12/243,260, filed on Oct. 1, 2008, now Pat. No. 8,096,454.

(51) Int. Cl.
*B60R 9/045* (2006.01)
(52) U.S. Cl. ..................................................... 224/321
(58) Field of Classification Search .................. 224/309, 224/315, 319, 321, 322, 324, 325
See application file for complete search history.

(56) References Cited

U.S. PATENT DOCUMENTS

| | | | |
|---|---|---|---|
| 4,132,335 A | | 1/1979 | Ingram |
| 4,294,388 A | | 10/1981 | Wünstel |
| 4,848,112 A | * | 7/1989 | Graber et al. .................. 70/231 |
| 5,071,050 A | | 12/1991 | Pudney et al. |
| 5,195,670 A | * | 3/1993 | Piretti et al. .................. 224/321 |

(Continued)

FOREIGN PATENT DOCUMENTS

JP       07-228198       8/1995

OTHER PUBLICATIONS

International Search Report and Written Opinion in corresponding International Patent Application No. PCT/US2012/024500, mailed Sep. 28, 2012, 3 pages.

*Primary Examiner* — Justin Larson
(74) *Attorney, Agent, or Firm* — Harness, Dickey & Pierce, P.L.C.

(57) ABSTRACT

A vehicle article carrier system for use on an outer body surface of a vehicle. The system may have a pair of support rails secured to the outer body surface. At least one cross bar having a pair of end supports extends between the support rails. Each end support has a housing and a rotatable locking component secured to the housing for rotatable movement. One of the housing and the rotatable locking component has a biased implement projecting therefrom, and the other has a plurality of structural elements arranged in a circumferential pattern. The biased implement engages with at least one of the structural elements to provide an additional holding force to the rotatable locking component when the rotatable locking component has been tightened.

18 Claims, 17 Drawing Sheets

U.S. PATENT DOCUMENTS

| | | | |
|---|---|---|---|
| 5,377,890 A | | 1/1995 | Brunner et al. |
| 5,388,434 A | * | 2/1995 | Kalis .................................. 70/58 |
| 5,564,610 A | * | 10/1996 | Barron .......................... 224/268 |
| 5,657,914 A | | 8/1997 | Stapleton |
| 5,732,864 A | * | 3/1998 | Stapleton ....................... 224/321 |
| 5,862,715 A | * | 1/1999 | Lemire ........................... 74/553 |
| 5,954,192 A | * | 9/1999 | Iitsuka .......................... 200/336 |
| 6,070,774 A | * | 6/2000 | Rak et al. ...................... 224/321 |
| 6,131,782 A | * | 10/2000 | De Silva et al. ............... 224/321 |
| 6,705,498 B2 | * | 3/2004 | Gantert .......................... 224/401 |
| 6,971,143 B2 | * | 12/2005 | Domroese ........................ 16/441 |
| 7,636,998 B2 | * | 12/2009 | Tenhuisen et al. ............... 29/516 |
| 7,674,240 B2 | * | 3/2010 | Webler et al. .............. 604/97.02 |
| 7,926,686 B2 | * | 4/2011 | Salvador et al. ............... 224/321 |
| 2009/0321485 A1 | | 12/2009 | Jamieson et al. |
| 2010/0252595 A1 | | 10/2010 | Heuchert et al. |

\* cited by examiner

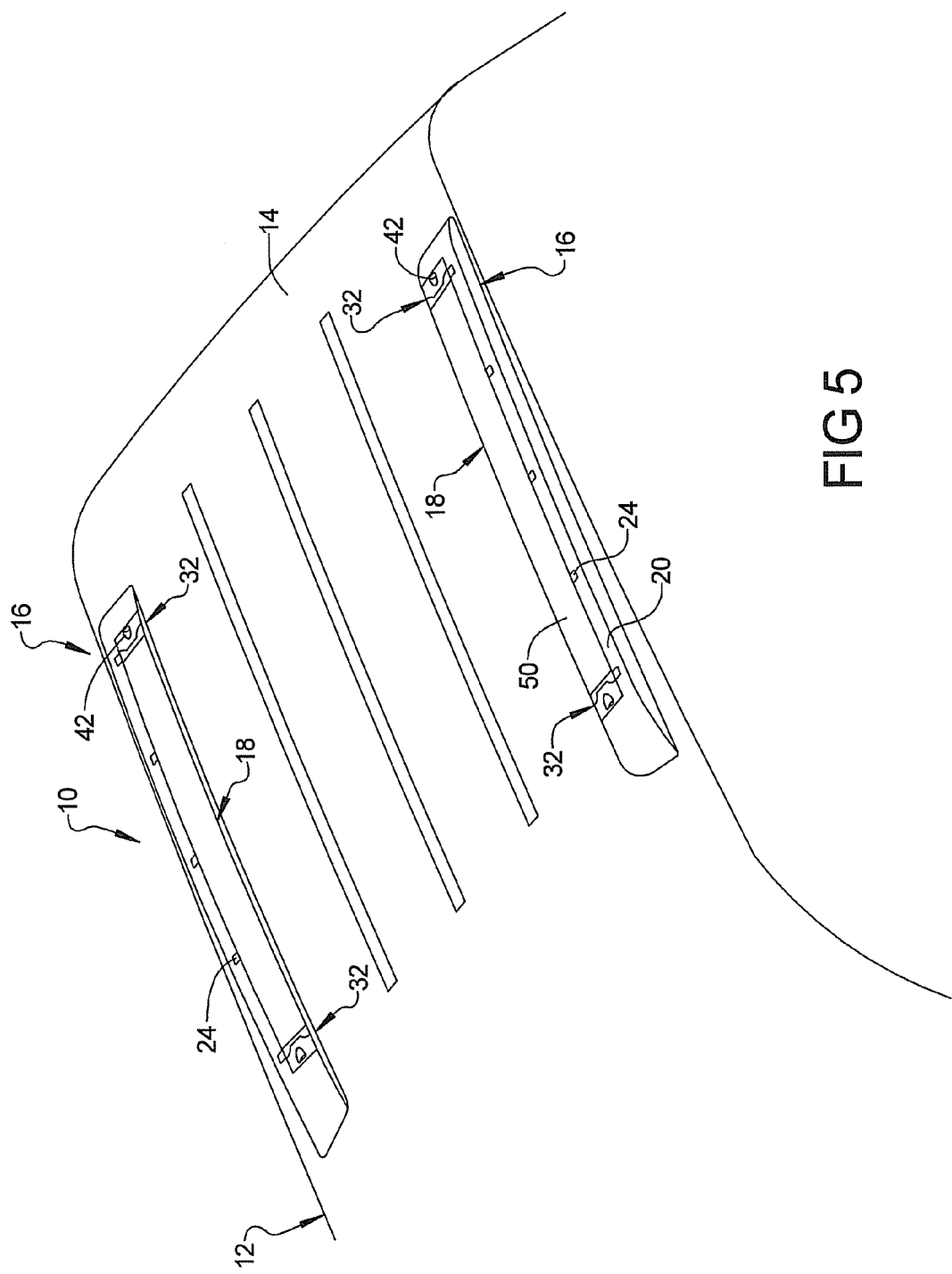

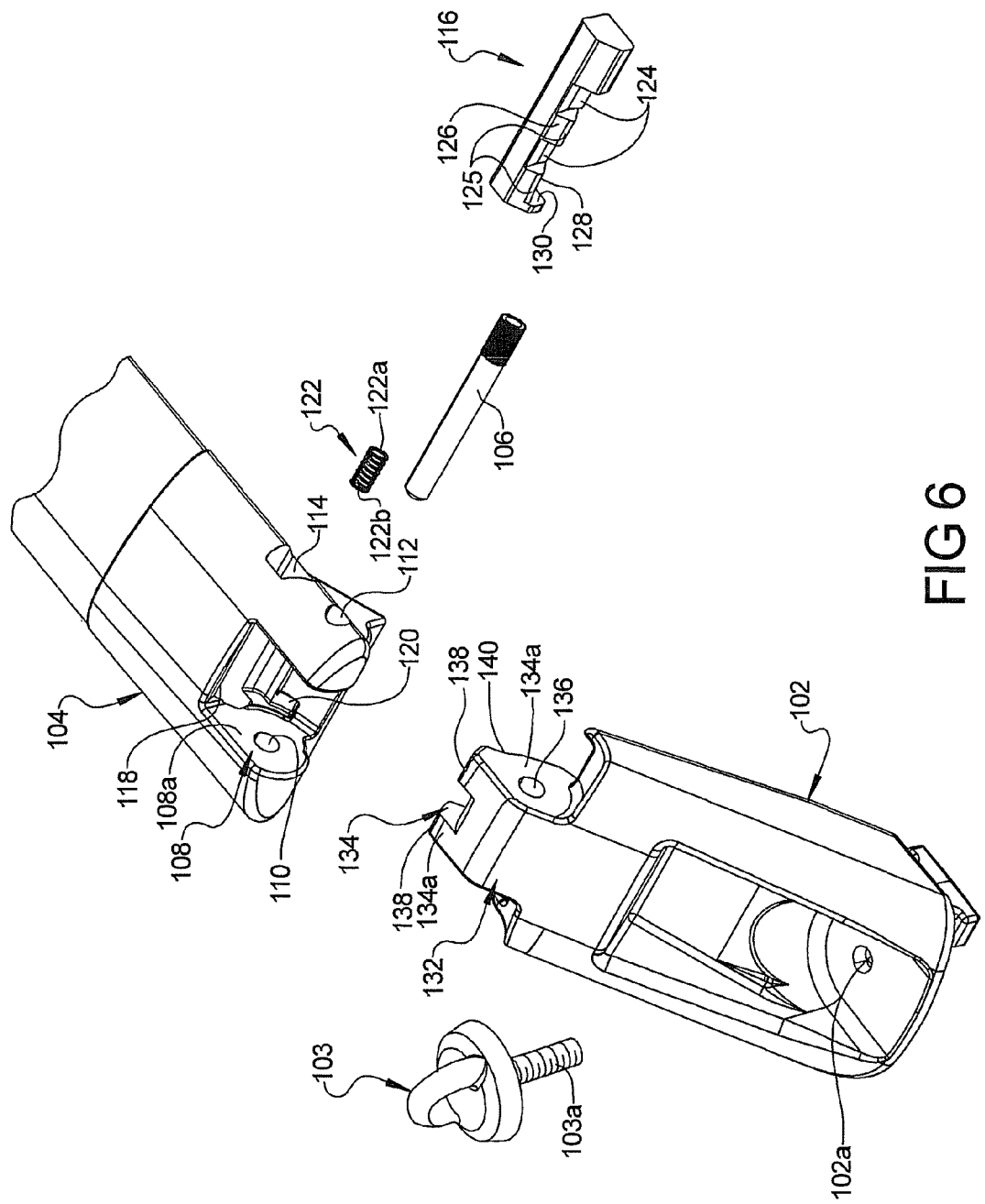

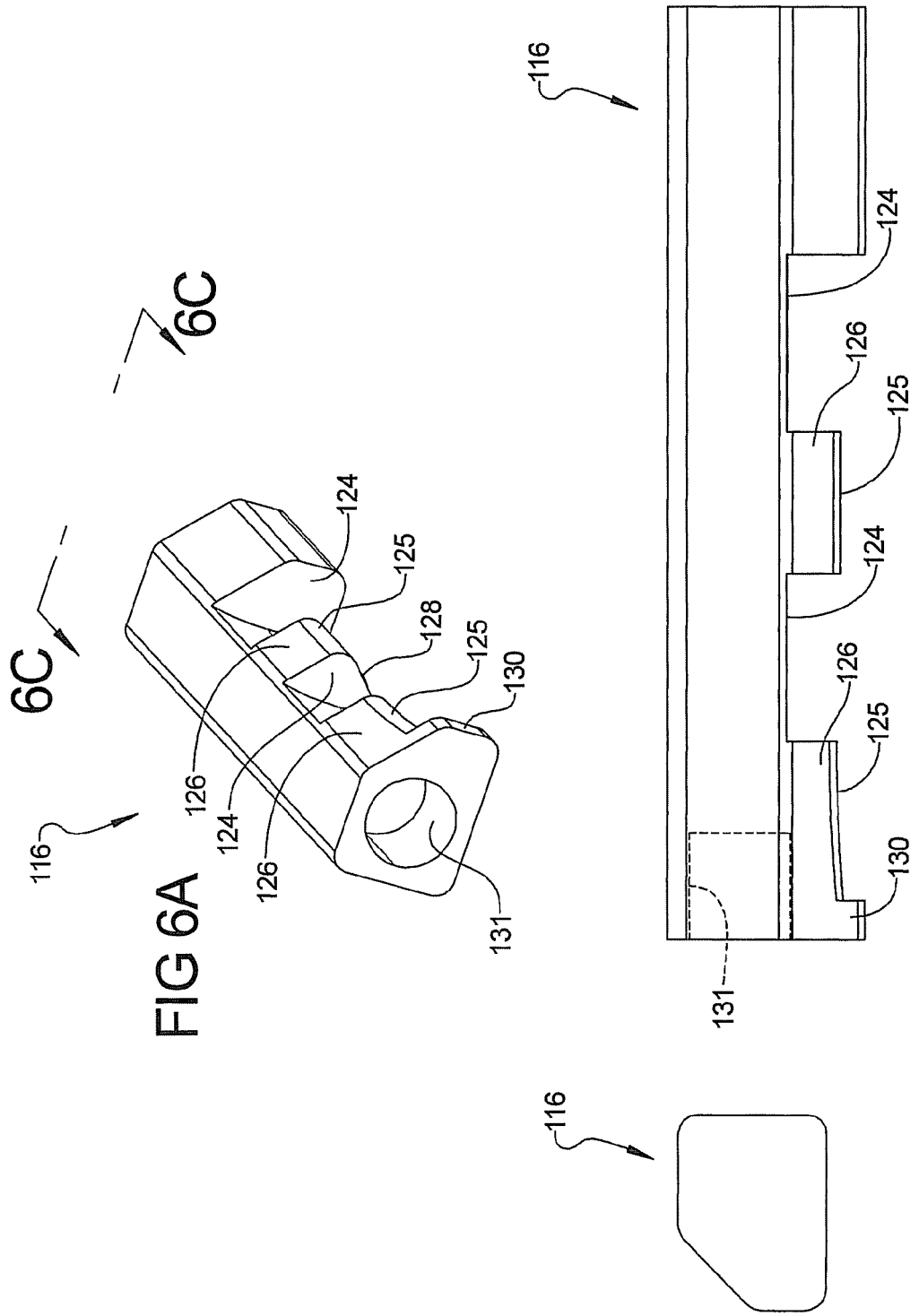

FIG 10
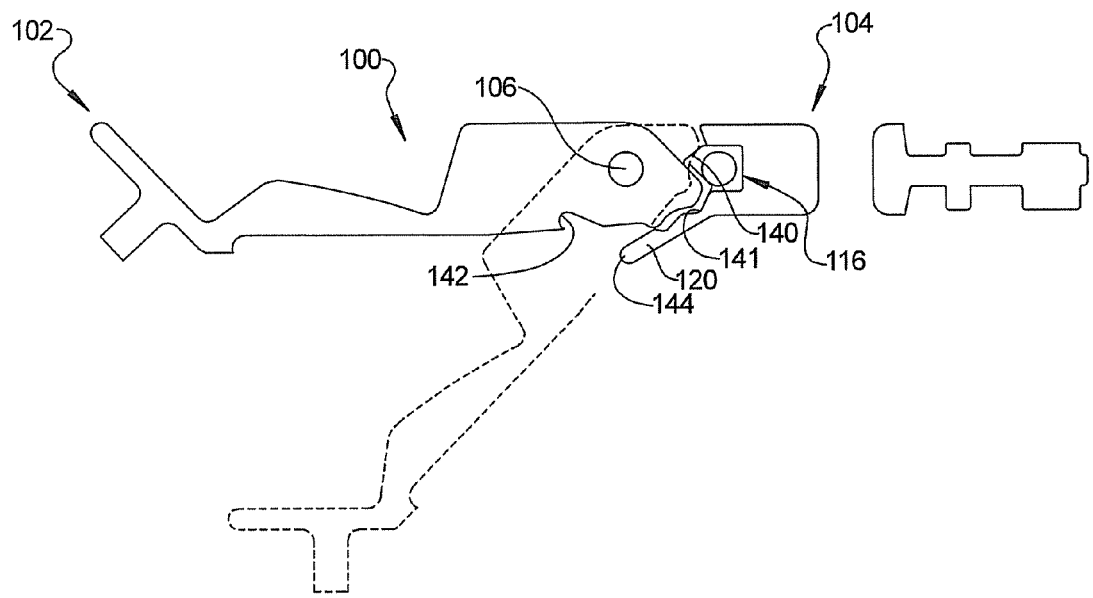
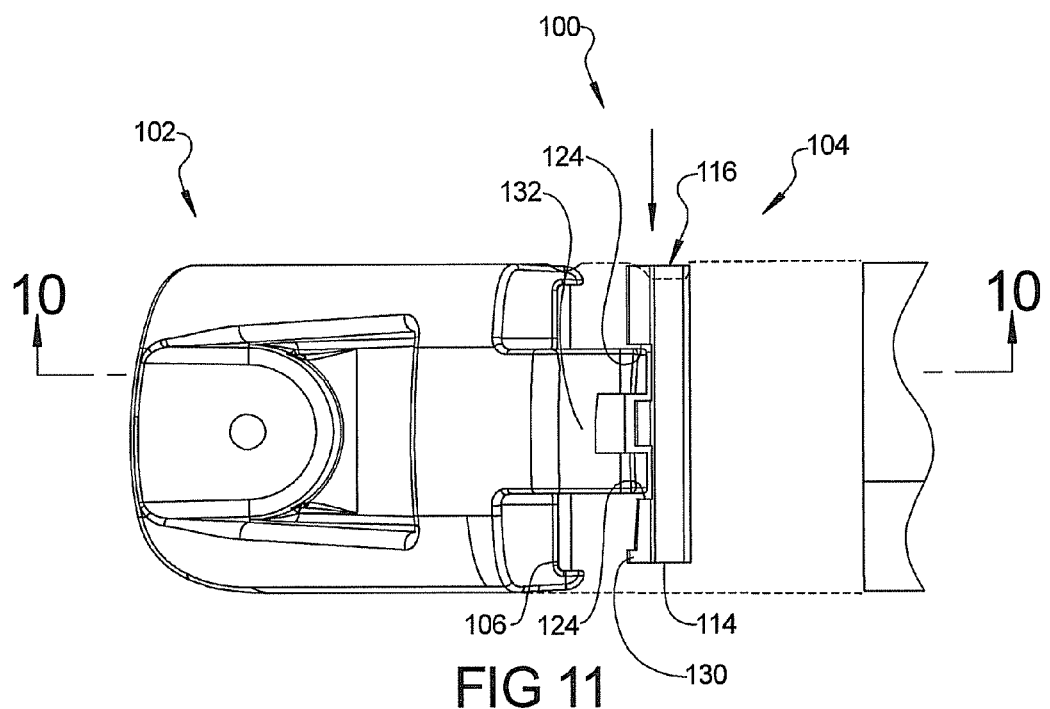
FIG 11

SYSTEM AND METHOD FOR VEHICLE ARTICLE CARRIER HAVING STOWABLE CROSS BARS

CROSS-REFERENCE TO RELATED APPLICATIONS

This application is a continuation-in-part of U.S. patent application Ser. No. 12/637,907, filed Dec. 15, 2009, which is a continuation-in-part of U.S. patent application Ser. No. 12/243,260, filed Oct. 1, 2008. The entire disclosure of the above applications is incorporated herein by reference.

FIELD

The present disclosure relates to vehicle article carrier systems, and more particularly to a vehicle article carrier system and method having cross bars that can be secured in operative positions by a rotatable locking knob that provides a locking assist feature.

BACKGROUND

The statements in this section merely provide background information related to the present disclosure and may not constitute prior art.

Vehicle article carrier systems are used on a wide variety of motor vehicles to transport objects above an outer surface of a vehicle. Typically such vehicle article carriers are secured on an outer body surface of a vehicle, for example such as on a roof of the vehicle. A vehicle article carrier often includes one, but more typically two, cross bars that are supported on support rails, where the support rails are fixedly secured to the roof of the vehicle. The cross bars are supported on the support rails so that they extend laterally (i.e., width-wise) above the outer body surface of the vehicle between the two support rails. The cross bars are thus supported above the outer body surface and used to support articles thereon, typically with the assistance of cargo straps such as bungee cords, rubber cords or nylon cords.

While such vehicle article carriers are highly useful for transporting articles thereon, the cross bars do typically add a small degree of wind resistance as the vehicle travels. With the present day emphasis on maximizing fuel economy of vehicles of all types, there is an increased interest in providing a vehicle article carrier construction which can eliminate the wind resistance of the cross bars when the cross bars are not needed. To this end many vehicle article carriers incorporate cross bars that can be removed, although removal can sometimes require special tools and somewhat time consuming procedures. If removed, then the cross bars need to be stored somewhere. Since the cross bars typically have a length which is close to the overall width of the outer body surface of the vehicle (i.e., the roof portion), the cross bars are not always easily stored inside the vehicle. Even if they are able to be stored inside the vehicle, they may use up a considerable amount of otherwise available cargo space inside the vehicle or otherwise interfere with the full use of the available cargo space within the vehicle. Storing the cross bars off of the vehicle, such as in one's garage, is an option, but then that gives rise to the possibility that an unanticipated need may arise to use the vehicle article carrier, and the user may not have the cross bars with him/her in the vehicle.

Another limitation with present day vehicle article carrier systems can be the amount of rotational force that needs to be applied to a rotatable locking member that locks an end support to its respective support rail. Such locking members are used to tighten a clamping member, for example a tap plate, within its respective support rail. However, some individuals may have limited hand strength, either because of an injury or simply because of being small in stature, and may have difficulty applying the needed tightening force to a rotatable locking member. Sometimes such individuals are able to apply a force that meets only a minimum required force to securely lock the locking member onto its respective support rail. When only the minimum required force is applied, there may exist the possibility of the locking member loosening during use, and because the initial tightening was made only to a minimum required force, the loosening that occurs may be sufficient to allow the cross bar being supported by the end support to wobble. Therefore, any mechanism that could be easily implemented on the end support to assist in preventing loosening of its associated rotatable locking member would be highly desirable.

SUMMARY

In one aspect the present disclosure relates to a vehicle article carrier system for use on an outer body surface of a vehicle to removably support articles above the outer body surface. The system may comprise a pair of support rails secured to the outer body surface generally parallel to one another, and extending along a major longitudinal axis of the vehicle. At least one cross bar may be used that has dimensions sufficient to extend between the support rails when the support rails are secured to the outer body surface of the vehicle. The cross bar may have a central portion and a pair of end supports at opposite ends of the central portion. Each end support may have a housing and a rotatable locking component secured to the housing for rotatable movement, with one of the housing and the rotatable locking component having a biased implement projecting therefrom, and the other one of the housing and the rotatable locking component having a plurality of structural elements arranged in a circumferential pattern. The biased implement engages with at least one of the structural elements to provide an additional holding force to the rotatable locking component when the rotatable locking component has been tightened.

In another aspect the present disclosure relates to a vehicle article carrier system for use on an outer body surface of a vehicle to removably support articles above the outer body surface. The system may comprise a pair of support rails secured to the outer body surface generally parallel to one another, and extending along a major longitudinal axis of the vehicle. At least one cross bar may be used that has dimensions sufficient to extend between the support rails when the support rails are secured to the outer body surface of the vehicle. The cross bar may have a central portion and a pair of end supports at opposite ends of the central portion. Each end support may have a housing and a rotatable locking component secured to the housing for rotatable movement. The rotatable locking component may have a spring biased ball plunger projecting therefrom, and the housing may have a plurality of structural elements arranged in a circumferential pattern. A ball of the spring biased ball plunger may engage with at least one of the structural elements during rotation of the rotatable locking component to provide an additional holding force to the rotatable locking component when the ball is engaged with the structural elements.

In still another aspect the present disclosure relates to a vehicle article carrier system for use on an outer body surface of a vehicle to removably support articles above the outer body surface. The system may comprise a pair of support rails secured to the outer body surface generally parallel to one another, and extending along a major longitudinal axis of the vehicle. At least one cross bar may have dimensions sufficient to extend between the support rails when the support rails are secured to the outer body surface of the vehicle. The cross bar may have a central portion and a pair of end supports at opposite ends of the central portion. Each end support may have a housing and a rotatable locking component secured to the housing for rotatable movement. The rotatable locking component may have a spring biased ball plunger projecting therefrom, and the housing may have a plurality of grooves formed in a surface thereof. Each rotatable locking component may include a locking post fixedly secured thereto for engaging with a respective one of the support rails, to assist in securing its associated end support to one of the support rails. A ball of the spring biased ball plunger engages with at least one of the grooves during rotation of the rotatable locking component to provide an additional holding force to the rotatable locking component when the ball is engaged with one of the grooves.

In still another aspect the present disclosure relates to an end support for use with a cross bar of a vehicle article carrier system. The end support may comprise a housing and a manually graspable, rotatable locking component secured to the housing for rotatable movement relative to the housing. One of the housing and the rotatable locking component may have a biased implement projecting therefrom, and the other one of the housing and the rotatable locking component may have a plurality of structural elements arranged in a circumferential pattern. The biased implement engages with at least one of the structural elements to provide an additional holding force to the rotatable locking component when the rotatable locking component has been tightened.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a view of the system of FIG. 1 but with both cross bars positioned in their stowed configurations;

FIG. 6 is an exploded perspective view of another embodiment of the present disclosure illustrating another embodiment of the end support that may be used with the system and method of the present disclosure;

FIG. 6A is a perspective view of just the locking block of the end support;

FIG. 6B is a plan view of the locking block of FIG. 6A;

FIG. 6C is an end view of the locking block of FIG. 6A taken in accordance with directional line 6C in FIG. 6A;

FIG. 10 is a simplified cross-sectional side view of the end support of FIG. 7 taken along section line 10-10 in FIG. 11, showing the orientation of the locking block when it is pressed into a position permitting rotational motion between the neck and base portions;

FIG. 11 is a partial plan view of the end support of FIG. 9 further illustrating the orientation of the locking block when it is pressed into the base portion to allow rotational movement between the neck and base portions;

DETAILED DESCRIPTION

Figure 1:
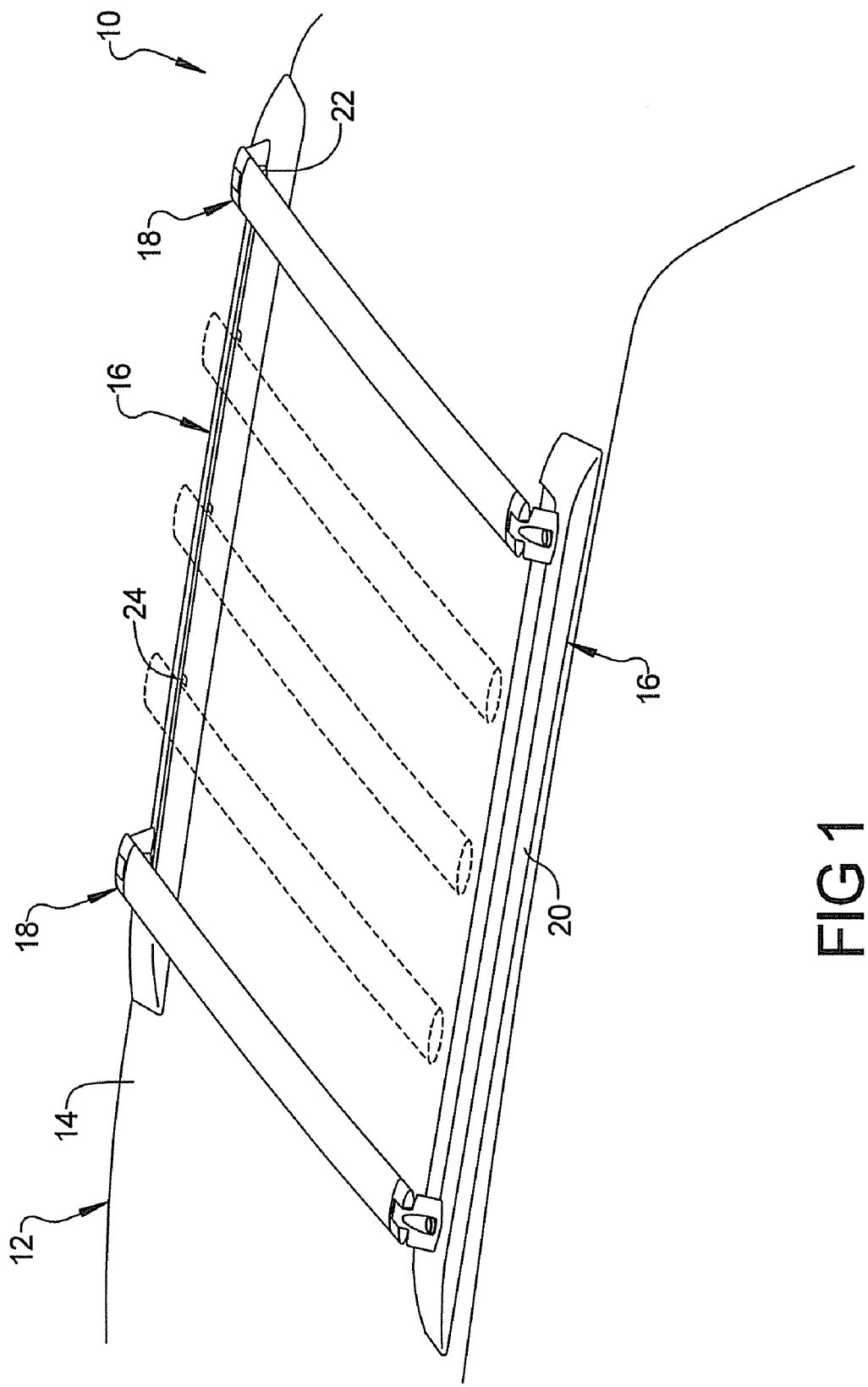
FIG. 1 is a perspective view of a portion of a vehicle illustrating one embodiment of a vehicle article carrier of the present disclosure mounted on an outer body surface of the vehicle, with the cross bars of the vehicle article carrier each being mounted in an operative position.

The following description is merely exemplary in nature and is not intended to limit the present disclosure, application, or uses. It should be understood that throughout the drawings, corresponding reference numerals indicate like or corresponding parts and features.

Referring to FIG. 1, there is vehicle article carrier system 10 supported on an outer body surface 14 of a vehicle 12. The vehicle 12 may comprise a car or sports utility vehicle (SUV), van, minivan or any other form of vehicle where it is desired to be able to support articles above its outer body surface. The system 10 may include a pair of support rails 16 that are fixedly secured to the outer body surface 14 generally parallel to one another, and extending generally parallel to a major longitudinal axis of the vehicle outer body surface 14. At least one, and more preferably a pair, of cross bars 18 are secured to the support rails 16. As will be explained more fully in the following paragraphs, it is a principal advantage of the system 10 that the cross bars 18 may be supported (or "stowed") in a substantially hidden, highly aerodynamic manner when not in use, but are able to be positioned above the support rails 16 quickly and easily when needed for use. Also, any type of track or track-like structure could potentially be used to form the support rails 16.

Figure 2:
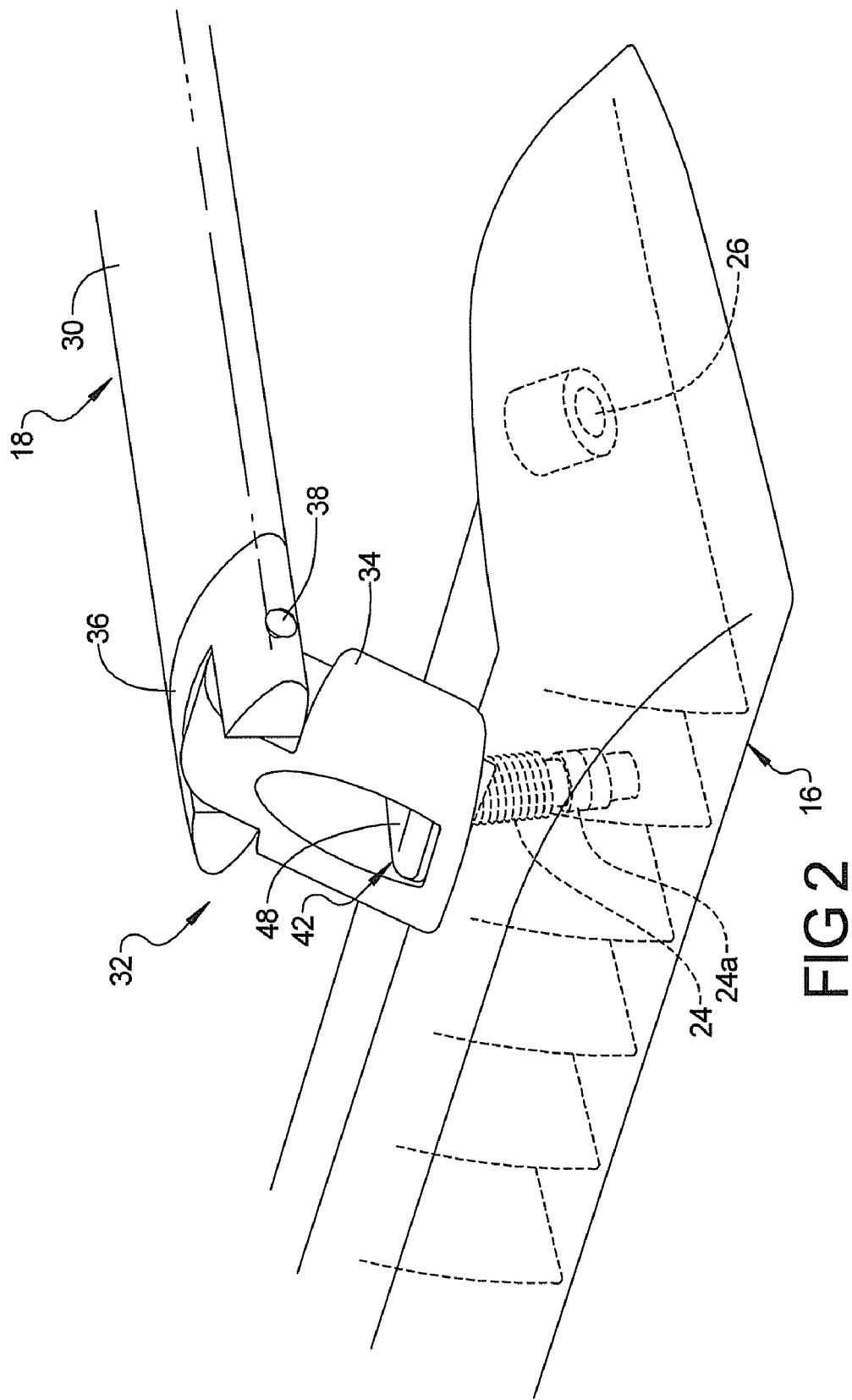
FIG. 2 is an enlarged perspective view of a portion of the vehicle article carrier of FIG. 1, with ones of the first and second attachment points being visible.

Referring further to FIG. 1, the support rails 16 each include a raised shoulder portion 20 and a recessed portion 22 extending along substantially a full length thereof. In FIG. 2 each support rail 16 has at least one first attachment point 24 and a pair of second attachment points 26. If two cross bars 18 are used with the system 10, then preferably a pair of first attachment points 24 will be incorporated. For the purpose of discussion it will be understood that a pair of cross bars 18 is used with the system 10. One pair of first attachment points 24 is arranged at opposite ends of each support rail 16. Similarly, one pair of second attachment points 26 is provided at the opposite ends of each of the support rails 16. Optionally but preferably, a plurality of additional first attachment points 24 are formed along each said support rail 16 that also enable each of the cross bars 18 to be secured at a plurality of different operative positions along the support rails 16 to better support variously sized and shaped articles thereon. The attachment points 24 are aligned so that at whatever longitudinal position along the support rails 16 the cross bars 18 are installed at for operation, the cross bars 18 will be extending generally perpendicularly between the support rails 16.

Referring to further to FIG. 2, one of the first attachment points 24 can be seen in greater detail. Each first attachment point 24 forms a threaded female bore that is aligned with an associated threaded fastening component 24a, such as a RIV-NUT™ fastener, fixedly secured in the outer body surface 14. Each second attachment point 26 forms a female threaded bore that is integrally formed in the support rail 16. Of course the second attachment point 26 could be formed by a metallic, press fit component having an internal threaded surface. Each first attachment point 26 will include an associated fastening component 24a aligned therewith and fixedly secured to the outer body surface 14. Thus, when the end supports 32 are attached at any pair of first attachments points 24, the cross bar 18 will be securely fastened to not only the support rails 16 but also to the outer body surface 14. This provides an extremely strong attachment arrangement for the cross bars 18.

In FIG. 2 the construction of one of the cross bars 18 can also be seen in greater detail. The cross bars 18 may be identical in construction, but they need not be. For convenience, it will be assumed that the cross bars 18 are identical in construction. The cross bar 18 shown in FIG. 2 includes a central portion 30 having an end support 32 at each opposite end thereof. The central portion 30 may form a tubular component made from a suitably strong material, for example aluminum or steel. The overall length of the cross bar 18 is sufficient to span the distance between the support rails 16 and is thus typically only slightly less than the overall width of the outer body surface 14 of the vehicle 12.

Each end support 32 includes a neck portion 34 that is hingedly secured to a base portion 36 via a pivot pin 38. This enables the neck portions 34 to hold the central portion 30 above the support rails 16 when the cross bar 18 is in its operative position shown in FIGS. 1 and 2. To accomplish this the neck portion 34 extends at an angle between about 20 degrees and 90 degrees relative to the outer body surface 14 of the vehicle 12, and more preferably between about 45 degrees and 75 degrees. The pivot pin 38 may be a splined pin that is press fit into the base portion 36 of the end support 32. The neck portion 34 may be secured to the central portion 30 of the cross bar 18 in conventional fashion by being inserted into a tubular end of the central portion 18 and being fastened thereto by threaded fasteners 39.

Figure 3:
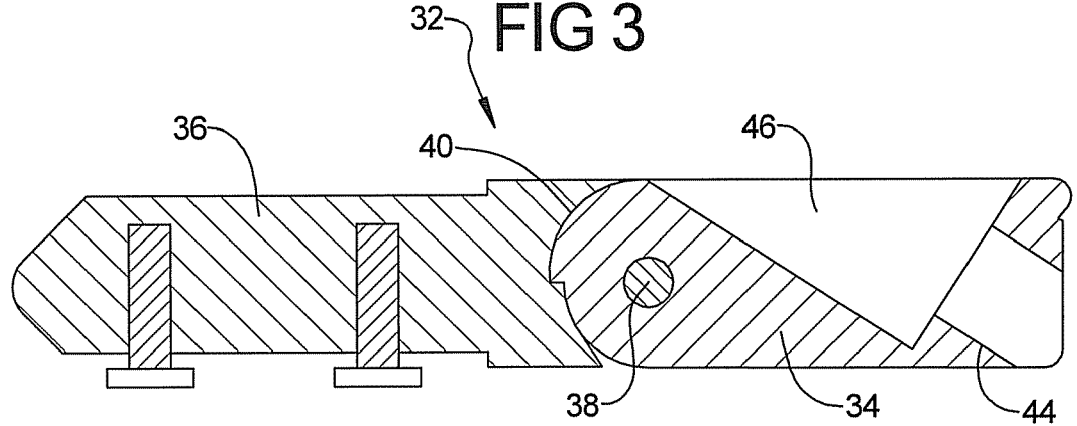
FIGS. 3 and 4 are partial cross sectional side views of one of the end supports illustrating the internal shoulder portion and internal wall portion that limit pivoting movement of the neck portion to a predetermined degree.
Figure 4:
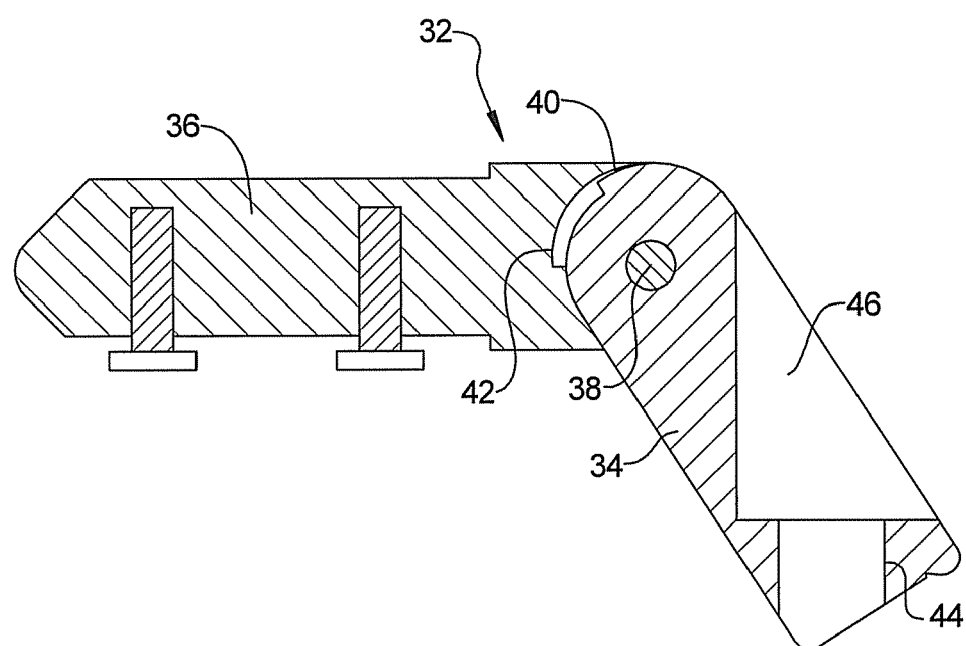

With further reference to FIGS. 3 and 4, the neck portion 34 can be seen to include an internal shoulder portion 40 that abuts an internal wall portion 41 of the base portion 36. This limits the pivoting motion of the neck portion 34 to a predetermined range and thus helps to provide rigidity to the cross bar 18 when the cross bar is in its operative position and supporting articles thereon.

With further reference to FIGS. 2, 3 and 4 the neck portion 34 also includes an attachment component in the form of a threaded male fastening element 42. The fastening element 42 extends through an opening 44 in a notched area 46 of the neck portion 34. The fastening element 42 can be secured in any one of the attachment points 24 or 26 to secure the end support 32 to a respective one of the support rails 16 in a stowed position or in an operative position. FIG. 2 shows the threaded fastening element 42 secured to one of the first attachment points 24. The threaded fastening element 42 may include a manually graspable wheel 48 that can be manually tightened and loosened by the fingers of one hand of the user, so that no external tools are required to remove and reposition the cross bar 18. Alternatively, the fastening element 42 may simply have a head portion with a slotted, Phillips, torx, etc. configuration that is loosened and tightened with a suitable tool.

Referring to FIG. 5 the cross bars 18 can be seen in their non-operative or "stowed" position. In the stowed position the threaded fastening element 42 is threadably engaged with the second pair of attachment points 26 at the opposite ends of the cross bar 18. In this configuration the cross bar 18 is essentially not visible from the side of the vehicle 12 and has an upper surface 50 that is substantially co-planar with the raised shoulder portion 20. This is because the neck portions 34 are able to pivot into position substantially in line with the central portion 30. Thus, when in its stowed position, the cross bar 18 provides no tangible aerodynamic drag during operation on the vehicle 12. The support rail 16 and the cross bar 18 essentially form a single, integrated and aesthetically pleasing assembly.

A particular feature that enables the neck portions 34 to lay flat and co-linear with the central portion 30 of the cross bar 18 is that the bores of the second attachment points 26 are formed at an angle to the outer body surface 14, as is visible in FIG. 2. In one embodiment this angle is between about 20-90 degrees, and more preferably between about 30 and 75 degrees.

Referring to FIG. 6, another embodiment of the end support 100 is shown. The end support 100 includes a neck portion 102 and a base portion 104 that may be pivotally coupled via a knurled pivot pin 106. The base portion 104 includes a recessed portion 108 having aligned bores 110 and 112. The pivot pin 106 is of dimensions enabling it to be inserted through the bores 110 and 112 and maintained therein via a friction fit. The neck portion 102 may include a rotatable, threaded fastening element 103 having a threaded shaft 103a that may be positioned in a bore 102a of the neck portion 102 and threadably secured with any one of the attachment points 24 or 26.

The base portion 104 further includes a locking block bore 114 adapted to receive a locking block 116 therein. The locking block 116 is received in a rear area 118 of the recessed portion 108 that forms an angular surface generally complimentary to a portion of the locking block 116. A wall portion 120 limits rotational movement of the neck portion 102 so that the neck portion cannot be moved past a point where it is co-linear with the base portion 104 when the end support 100 is in its stowed position. This will be described in greater detail in the following paragraphs. A coil spring 122 or any other like, suitable biasing element is disposed in the rear area 118 and provides a biasing force against the locking block 116, as will be described in further detail in the following paragraphs.

With further reference to FIGS. 6, 6A, 6B and 6C, the locking block 116 can be seen to include a pair of spaced apart cutouts 124 that help to define teeth 125. Each of the teeth 125 include an upper angled surface 126 and a lower angled surface 128 that converge to a point. The overall cross sectional shape of the locking block 116 approximately matches that of the locking block bore 114 so that when the locking block 116 is inserted into the bore 114, the locking block 116 cannot rotate, but can only slide laterally within the bore 114 a short, predetermined distance. The locking block 116 also includes a notched edge portion 130, visible in FIGS. 6B, 8 and 10, which prevents the locking block from falling out of the locking block bore 114 once the end support 100 is assembled. Essentially, notched edge portion 130 enables the locking block 116 to be captured in the base portion 104 when the neck portion 102 is assembled to the base portion 104. This feature will be described in further detail in the following paragraphs. A blind hole 131, visible in FIG. 6A, houses end 122a (visible in FIG. 6) of the spring 122, while the opposite end of the spring 122b abuts wall portion 108a in FIG. 6 when the locking block 116 is assembled in the base portion 104. The length of the spring 116, the depth of the blind hole 131 and the length of the locking block 116 are selected to allow a predetermined amount of lateral travel of the locking block 116, which in the embodiment shown is between about 0.125 inch and 0.75 inch, and more preferably about 0.5 inch. However, it will be appreciated that this length of travel is merely exemplary and can be varied considerably to meet personal preferences or specific application constraints or requirements.

Figure 7:
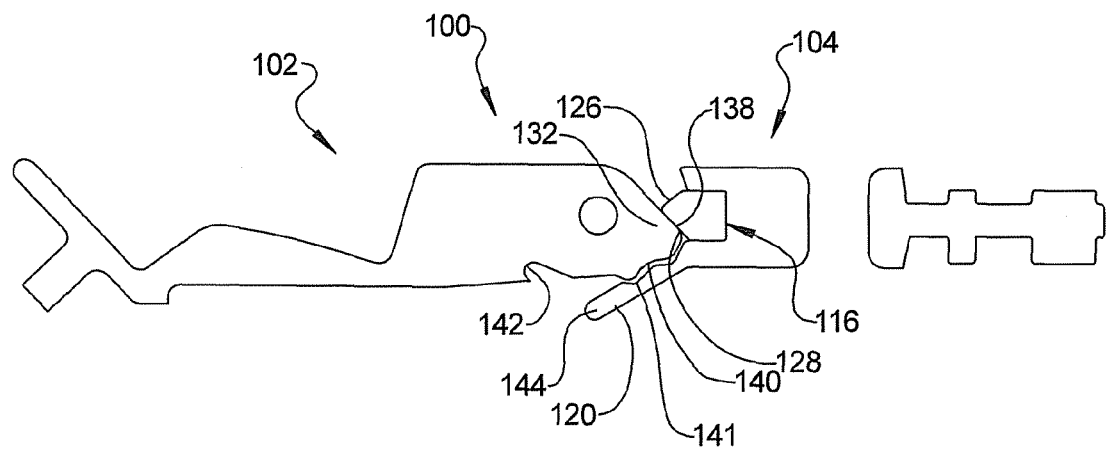
FIG. 7 is a simplified cross-sectional side view in accordance with section line 7-7 in FIG. 8 illustrating the end support locked in an operative position, with a locking block of the system preventing any pivoting movement between the neck and base portions of the end support.
Figure 8:
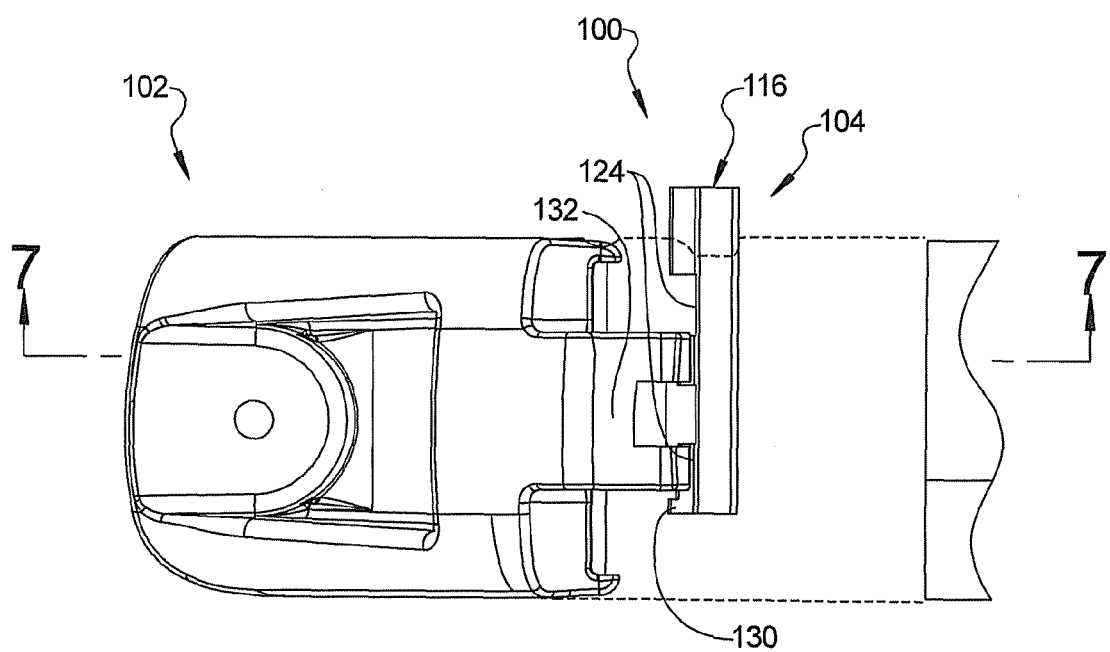
FIG. 8 is a partial plan view of the end support of FIG. 7 further illustrating the locking block in its stowed position.

Continuing to refer to FIGS. 6, 7 and 8, the neck portion 102 can be seen to include a projecting portion 132 having a pair of arms 134a. The overall width of the projecting portion 132 is such that it fits within the recessed portion 108 of the base portion 104. The width of each arm 134a is such that each may fit within the cutouts 124 in the locking block 116 when the locking block is fully depressed in the base portion 104 by a finger of a user. The projecting portion 132 also includes a bore 136 that receives the knurled pin 106 to maintain the neck portion 102 secured to the base portion, and to allow pivoting movement of the neck portion 102 relative to the base portion 104.

Referring to FIGS. 6, 7 and 8, the projecting portion 132 can be seen to include surfaces 138 (only one being visible) that engage with lower surfaces 128 of the teeth 125 of the locking block 116 when the neck portion 102 is in its stowed position (FIG. 7), and the locking block 116 is in its undepressed condition (as seen in FIG. 8). This prevents counter clockwise rotation of the neck portion 102. In this position a surface 140 of the projecting portion 132 also engages with a recess 141 of wall portion 120 to prevent clockwise rotational movement of the neck portion 102, as viewed in FIG. 7. Thus, the neck portion 102 is held against both clockwise and counterclockwise rotation, and is thus maintained in a substantially co-linear orientation with the base portion 104. This substantially or entirely eliminates any vibration or play between the neck portion 102 and base portion 104 when the vehicle on which the end support 100 is being used is moving, but while the system 10 is in not in use (i.e., in its stowed or inoperative position).

Figure 9:
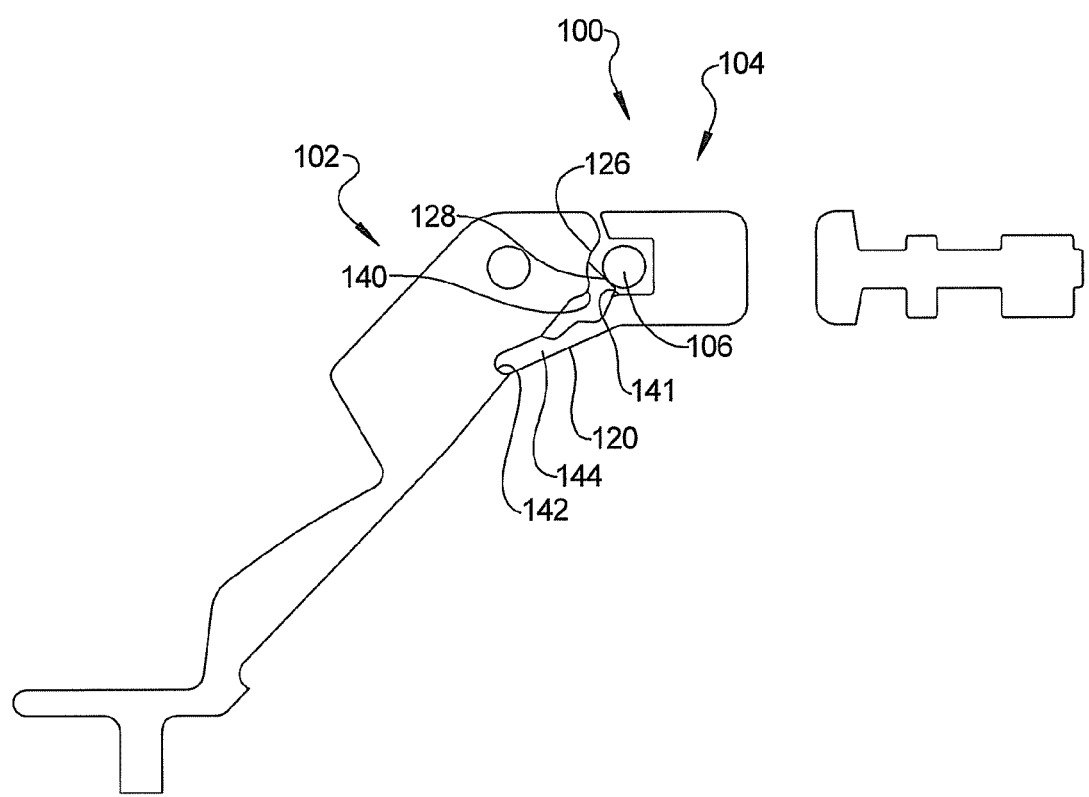
FIG. 9 is a partial cross-sectional side view of the neck portion and base portion, similar to that shown in FIG. 7, but with the neck portion in its operative position.

Referring further to FIGS. 6, and 9, the neck portion 102 is shown in its operative position. In this position a notched area 142 of the projecting portion 132 engages with a lip portion 144 of the wall portion 120 to prevent counterclockwise rotation of the base portion 102. The surface 140 now engages with the upper surfaces 126 of the teeth 125 of the locking block 116 when the locking block is in the position shown in FIG. 8 (i.e., undepressed), which prevents clockwise rotation of the neck portion 102. Thus, the neck portion 102 is also held against both clockwise and counterclockwise rotation when the locking block 116 is in the undepressed position shown in FIG. 8 and the neck portion 102 is in its operative position as shown in FIG. 9. This eliminates any significant wobble or play between the neck portion 102 and the base portion 104 while the end support 100 is being used to support articles above the outer body surface 14 (i.e., in its operative position).

When the locking block 116 is moved to its depressed position against the biasing force of the spring 122, as shown in FIG. 11, and held in this position by the user, the arm portions 134a of the projecting portion 132 of the neck portion 102 are aligned with the cutouts 124 of the locking block 116. Thus, the neck portion 102 is free to rotate along a limited arcuate path between its operative and stowed positions. Thus, to position the end support 100 in the desired position, the user simply depresses the locking block 116, positions and holds the neck portion 102 in the desired orientation (i.e., either operative or stowed), and then releases the locking block 116. Thereafter, the biasing force of the spring 122 pushes the locking block 116 back into its undepressed condition. This places the teeth 125 of the locking block 116 in lateral alignment (i.e., interfering alignment) with the arm portions 134a of the neck portion 102, and the teeth 125 of the locking block 116 will hold the neck portion 102 stationary relative to the base portion 104.

To assemble the end support 100 the spring 122 is first inserted in the locking block bore 114 and then the spring 122 is inserted in the blind hole 131 of the locking block 116, and the locking block 116 is then slid through the bore 114 until the end 122b of spring 122 contacts the wall portion 108a. Further pressure is then applied to the locking block 116 so that the locking block is pushed into, and held, completely within the base portion 104, as shown in FIG. 11. Then while the locking block 116 is held fully depressed within the locking block bore 114, the projecting portion 132 of the neck portion 102 is inserted into the recess 108 of the base portion 104. The locking block 116 may then be released, and the biasing force of the spring 122 will push the locking block 116 out to the position shown in FIG. 8, with the projection 130 on the locking block 116 abutting a side surface of the one of the arm portions 134a of the projecting portion 132, as shown in FIG. 8. This prevents the locking block 116 from being pushed completely out of the bore 114 by the spring 122. At this point the neck portion 102 may be further articulated clockwise or counterclockwise slightly to align the bore 136 with the bores 110 and 112 of the base portion 104. While the neck portion 102 is held with the bores 136, 110 and 112 aligned, the pivot pin 106 may be press fit into the bore 110 and blind hole 112.

Figure 12:
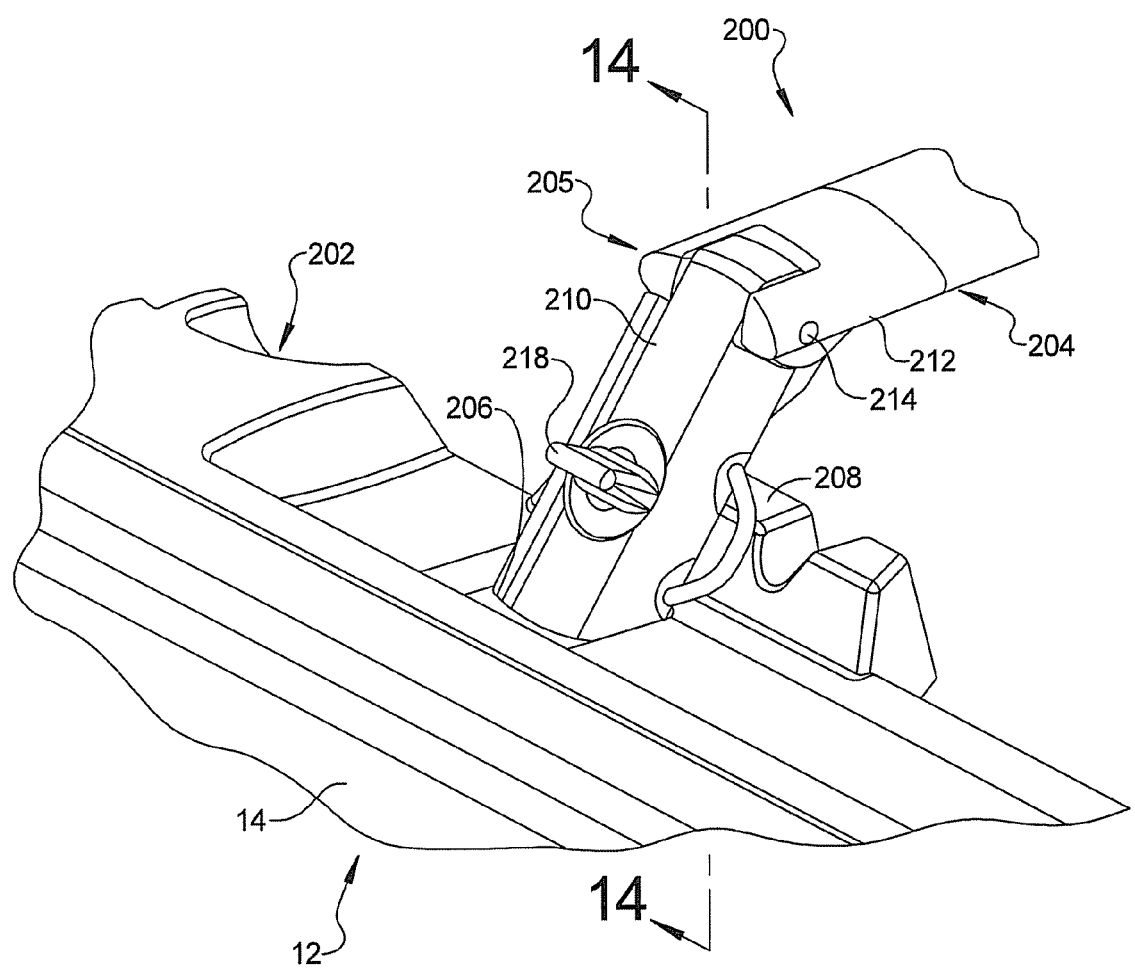
FIG. 12 is a perspective view of another embodiment of the present disclosure which includes a pod integrally formed with the support rail, and where the end supports of the cross bar include a securing mechanism adapted to couple a portion of the end support to the pod to provide even further enhanced structural rigidity to the cross bar when it is in its operative position.
Figure 13:
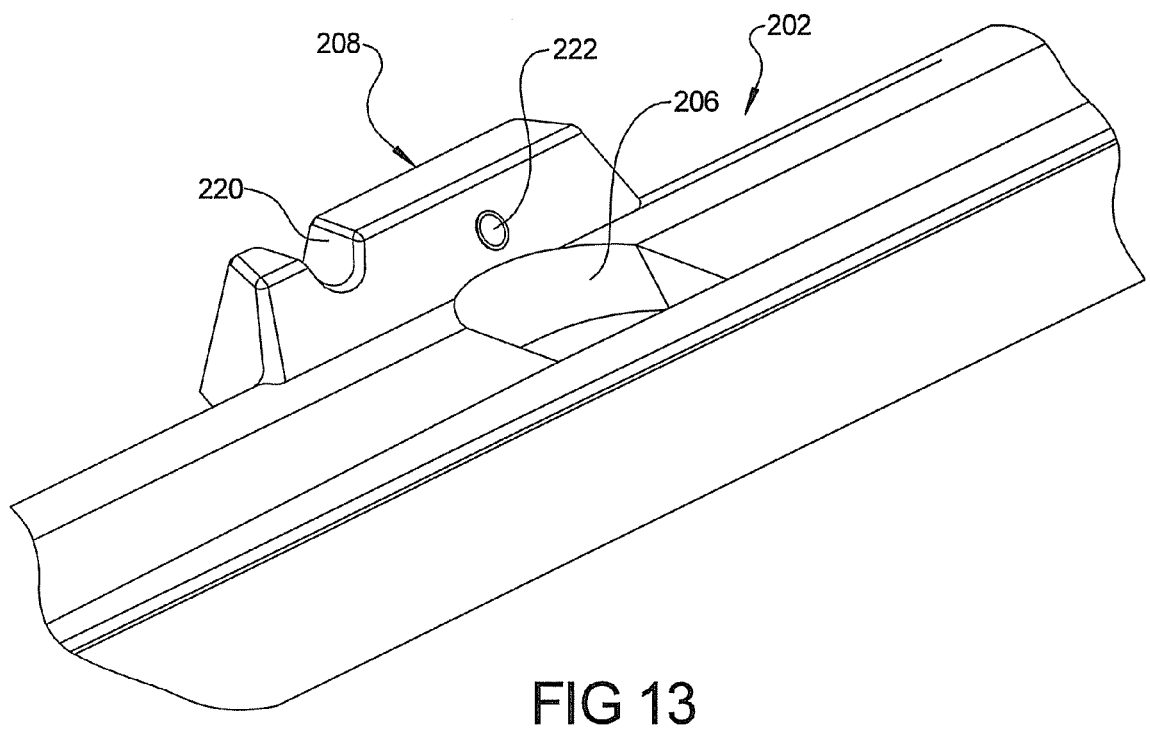
FIG. 13 is a perspective view of a portion of just the support rail of the system shown in FIG. 12.
Figure 14:
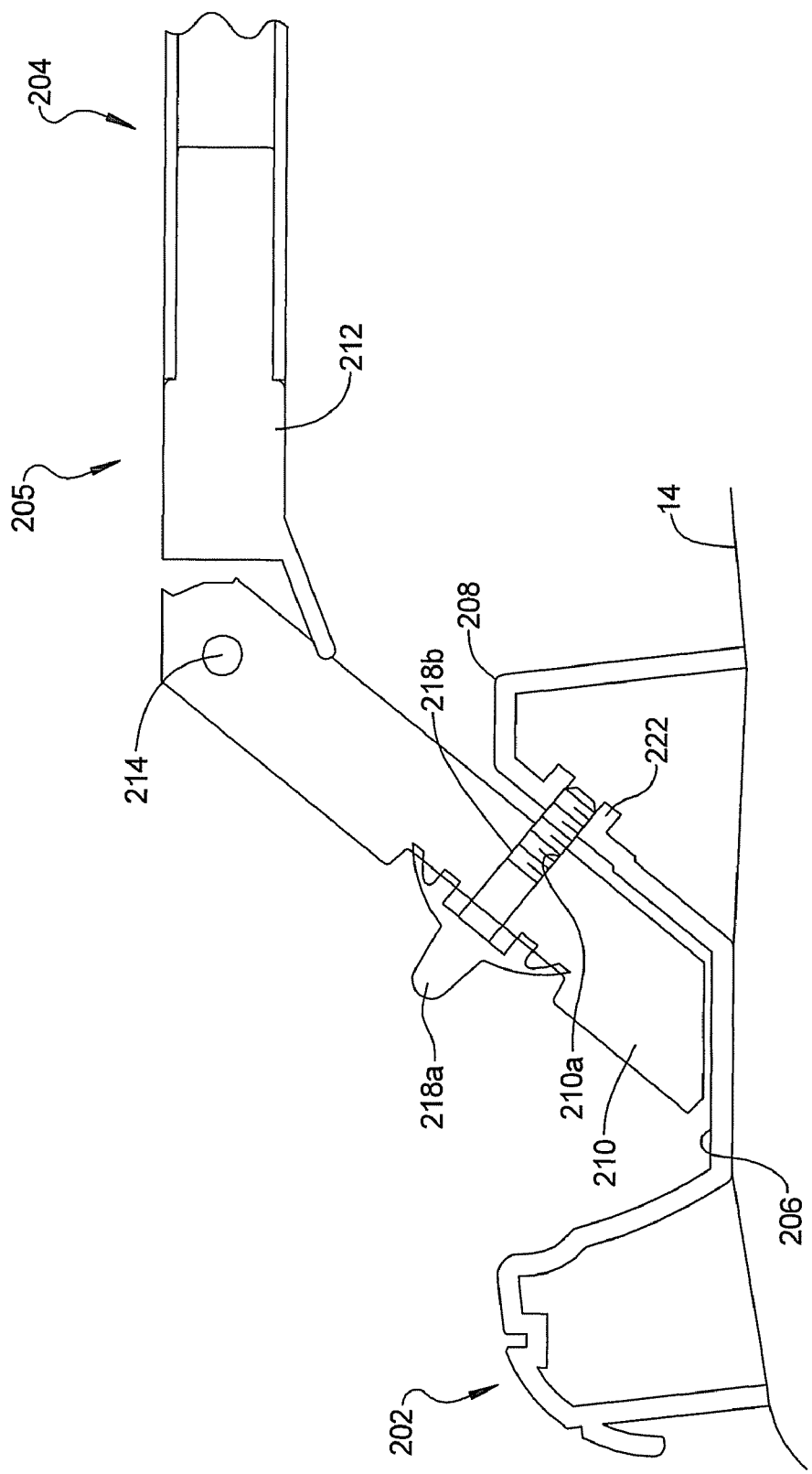
FIG. 14 is a cross sectional view of the end support shown in FIG. 12 attached to the support rail, taken in accordance with section line 14-14 in FIG. 12.

Referring now to FIGS. 12 through 14, another embodiment of a vehicle article carrier system 200 in accordance with the present disclosure is shown. The system 200 is somewhat similar to system 10 in that a support rail 202 is provided that may support a cross bar 204 thereon in either a stowed orientation, as described in connection with system 10, or in an operative position. In the stowed position the cross bar 204 may be secured to a second attachment point (not shown) on the support rail 202, such as described and shown for system 10, so that it rests on the support rail 202 along the longitudinal axis of the support rail, as described above for support rails 16 and cross bars 18 shown in FIG. 1. In the operative position the cross bar 204 may be used to support articles or widely varying sizes and shapes above the outer body surface 14 of the vehicle 12. It will also be appreciated that while only a single support rail 202 and a single cross bar 204 have been shown, that the system 200 may employ a pair of identical support rails 202 and a pair of cross bars 204, which may be identical or even slightly different in construction. The support rails 202 may be secured to the outer body surface 14 by RIVNUT® style fasteners or any other suitable fastening means.

With continuing reference to FIG. 12, the support rail 202 can be seen include a pocket 206 adjacent a protruding pod 208. The cross bar 204 may include an end support 205 having a neck portion 210 and a base portion 212 that are pivotally coupled to one another by a pivot pin 214. The base portion 212 is fixedly secured to a central portion 216. The central portion 216 of the cross bar 204 is elevated above the outer body surface 14 and supports articles thereon when the cross bar 204 is in use.

The neck portion 210 includes a user graspable fastening component 218 that may be rotated by the user grasping it with two or more fingers and rotating it, in this example clockwise. When the cross bar 204 is positioned in its stowed orientation, this allows the cross bar 204 to be securing retained to its associated support rail 202. When the cross bar 204 is in its operative orientation, with the neck portion 210 resting in the pocket 206 and leaning against the pod 208, the neck portion may be secured to the pod 208. The pod 208 provides the advantage of even further stabilizing the end support 205 against movement in both a longitudinal direction, that is, a direction parallel to the longitudinal axis of the support rail 202, as well as stabilizing the end support 205 against lateral movement (i.e., movement perpendicular to the longitudinal axis of the support rail 202).

Referring to FIGS. 12 and 13, the pocket 206 and the pod 208 can be seen in greater detail. The pod 208 is integrally formed with the support rail 202 and includes a recessed portion 220 having an opening (not visible). The opening allows a stud secured to the vehicle outer body surface 14 to project through a portion of the support rail 202 so that the support rail can be fixedly secured to the outer body surface 14. The recessed portion 220 allows room for a threaded nut or other form of retaining element to be positioned therein so as not to be visible when the support rail 202 is secured to the outer body surface 14. The pod 208 also includes a threaded insert 222 adapted to receive a threaded portion of the user engageable fastening component 218. The threaded insert 222 thus forms the first attachment point for the cross bar 204.

Referring to FIG. 14, a cross sectional view of the cross bar 204 secured in its operative position to the support rail 202 is shown. The user engageable actuating member 218 includes a dial-like element 218a that the user may grasp, as well as a threaded shaft 218b that extends through a bore 210a in the neck portion 210. The threaded shaft 218b may be retained in the neck portion 210 in any conventional manner, so that it cannot be removed from the neck portion 210. The threaded shaft 218b engages with the threaded insert in the pod 222 to hold the neck portion 210 securely to the pod 208.

Figure 15:
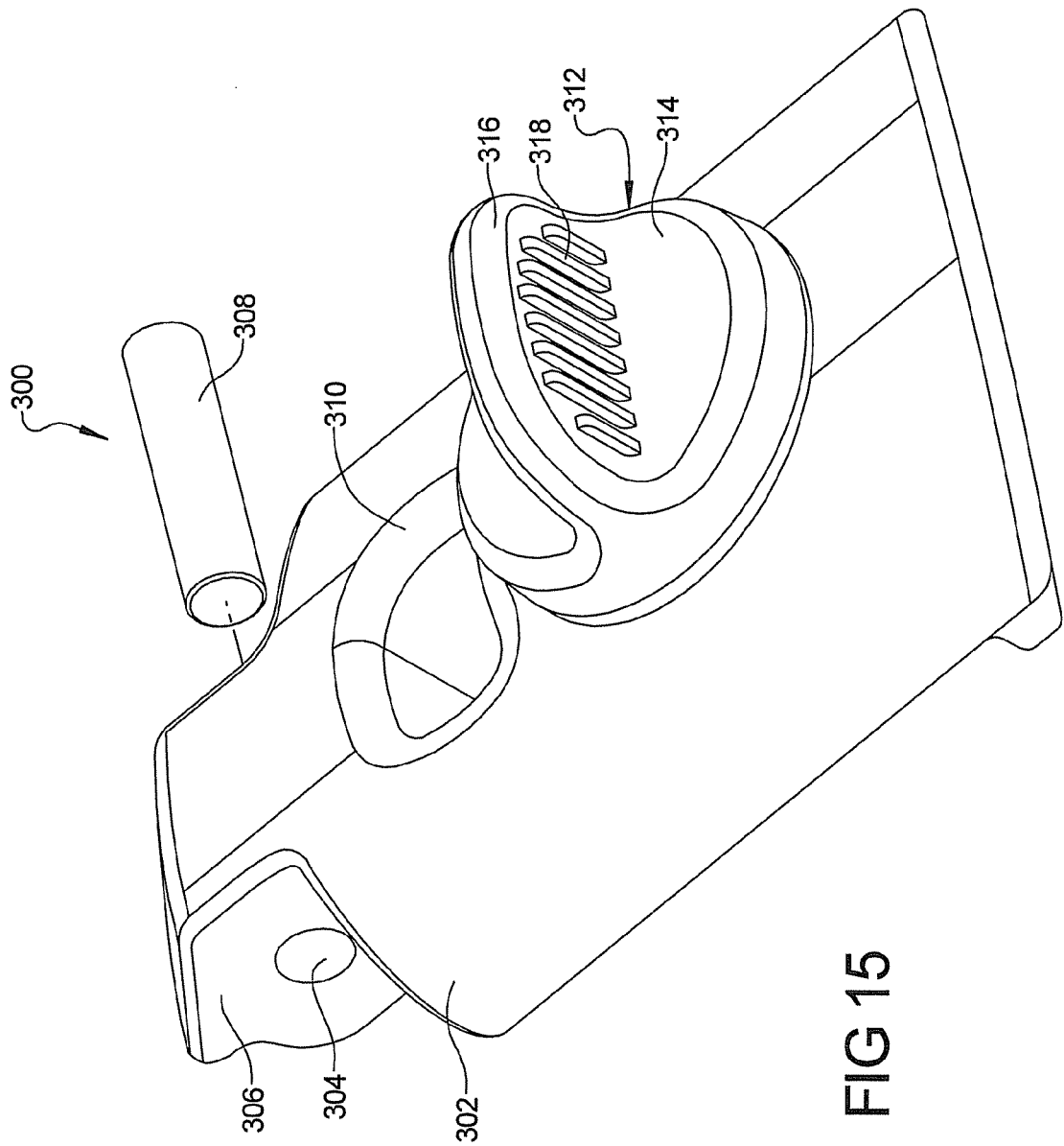
FIG. 15 is perspective view of an end support in accordance with another aspect of the present disclosure.

Referring now to FIGS. 15-19, an end support 300 is illustrated that may be used with the vehicle article carrier system 10 in place of the threaded fastening element 42, or alternatively in place of the threaded fastening element 103. Referring initially to FIG. 15, the end support 300 may include a housing 302 having a bore 304 formed within a neck portion 306 of the housing. The bore 304 may be used with a conventional fastening element or pivot pin-like element 308 for attaching the end support 300 to an end of the cross bar 18. However, it will be appreciated immediately that the end support 300, while especially well adapted to be pivotally coupled to a cross bar, is not restricted to use as a pivotally coupled end support. Thus, the end support 300 may be fixedly secured to a cross bar (i.e., non-pivotally coupled), and such an implementation is fully intended to fall within the scope of the present application and the appended claims.

Figure 16:
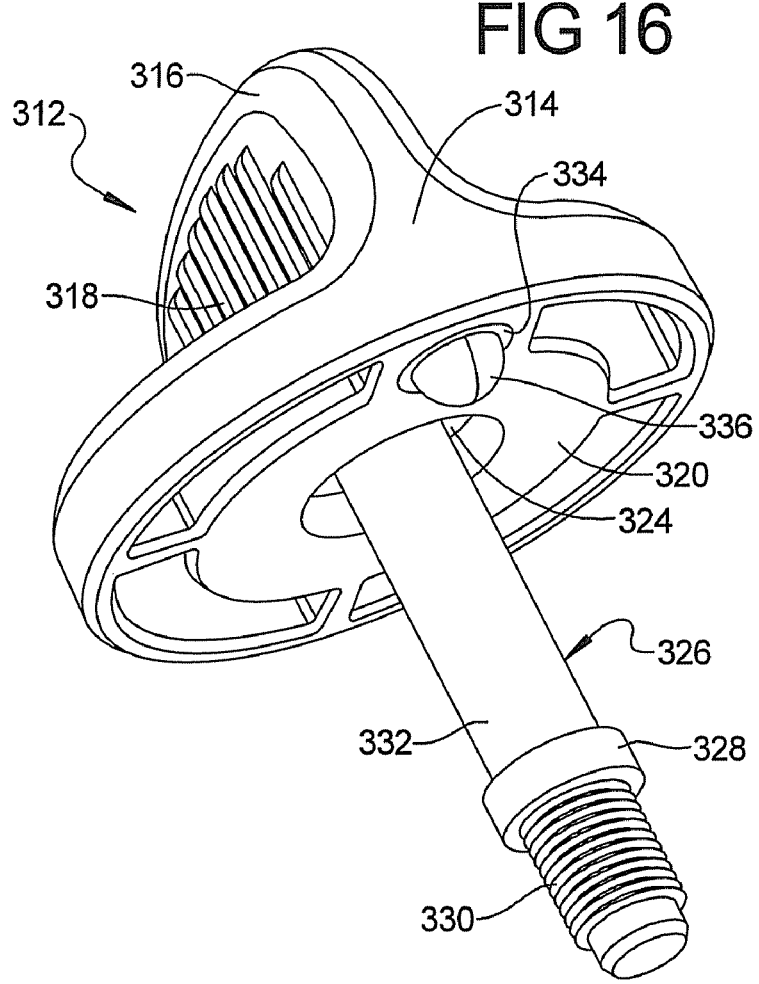
FIG. 16 is a bottom perspective view of just the rotatable locking component shown in FIG. 15.

The housing 302 may include an opening 310 formed therein for receiving an external fastening cord or like implement, for example a bungee cord or a nylon strap, that assists in holding articles to the vehicle article carrier 10. The housing 302 also has secured to it a rotatable locking component 312 that forms an assembly for fixedly securing the end support 300 to its respective support rail 16. Referring to FIGS. 15 and 16, the rotatable locking component 312 can be seen to include a body portion 314 having an integrally formed, manually graspable, raised portion 316 that forms a knob. The graspable raised portion 316 may include serrations or a textured surface 318 to aid an individual in grasping the portion 316 with a thumb and two or more fingers to better enable the individual to apply a rotational locking or unlocking torque to the locking component 312.

With further reference to FIG. 16, the body portion 314 can be seen to include a lower surface 320 and a central bore 324 within which is fixedly mounted a locking post 326. The locking post 326 may be insert molded with the body portion 314. The locking post 326 may include a shoulder portion 328 and a threaded end portion 330. The shoulder portion 328 provides a positive surface for retaining the locking post 326 to the body portion 314. The shoulder portion 328 may form an integral portion of the locking post 326 or it may be a separate, washer-like component that is fixedly secured to a shaft portion 332 of the locking post 326 via a set screw, or otherwise bonded to the shaft portion 332, after the shaft portion 332 is inserted through the bore 324.

Figure 17:
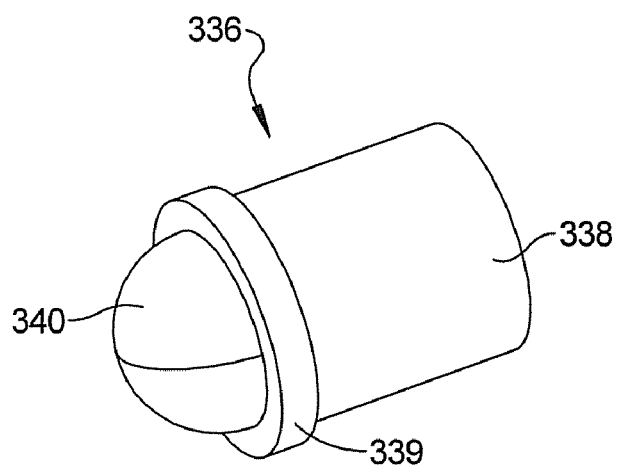
FIG. 17 is a perspective view of just the ball plunger assembly used in the end support of FIG. 15.

With further reference to FIG. 16, the housing 302 includes an additional bore 334 within which is disposed a biased implement in the form of a conventional ball plunger assembly 336. The ball plunger assembly 336 is typically held within the bore 334 by a friction fit, and is seated in the bore 334 before the rotatable locking member 312 is secured to the housing 302. The ball plunger assembly 336 is shown by itself in FIG. 17. Referring briefly to FIG. 17, the ball plunger assembly 336 generally includes a housing 338 which captures a precision ball 340 therein. The ball 340 is typically a stainless steel ball and is biased to the position shown in FIG. 17 by an internally mounted spring (not shown). The housing 338 may also include a shoulder 339 to limit the depth of insertion of the housing 338 into the bore 334. The ball plunger assembly 336 is commercially available from a number of sources, but one such source is Monroe Engineering of Auburn Hills, Mich. The ball plunger assembly 336 is used to provide a retaining force that helps to prevent the rotatable locking component 312 from loosening once it is tightened. As will be appreciated by those skilled in the art, such conventional ball plungers as ball plunger assembly 336 often allow a number of different indexing forces to be selected, which are often related to the diameter of the precision ball, as well as the spring force provided by assembly's internally mounted spring. The greater the degree of indexing force, the greater the amount of rotational torque that will be required to overcome the biasing force of the internal spring when tightening the rotatable locking component 312, but also the more resistance to loosening that the rotatable locking component 312 will have. This will be explained further in the following paragraphs.

Figure 18:
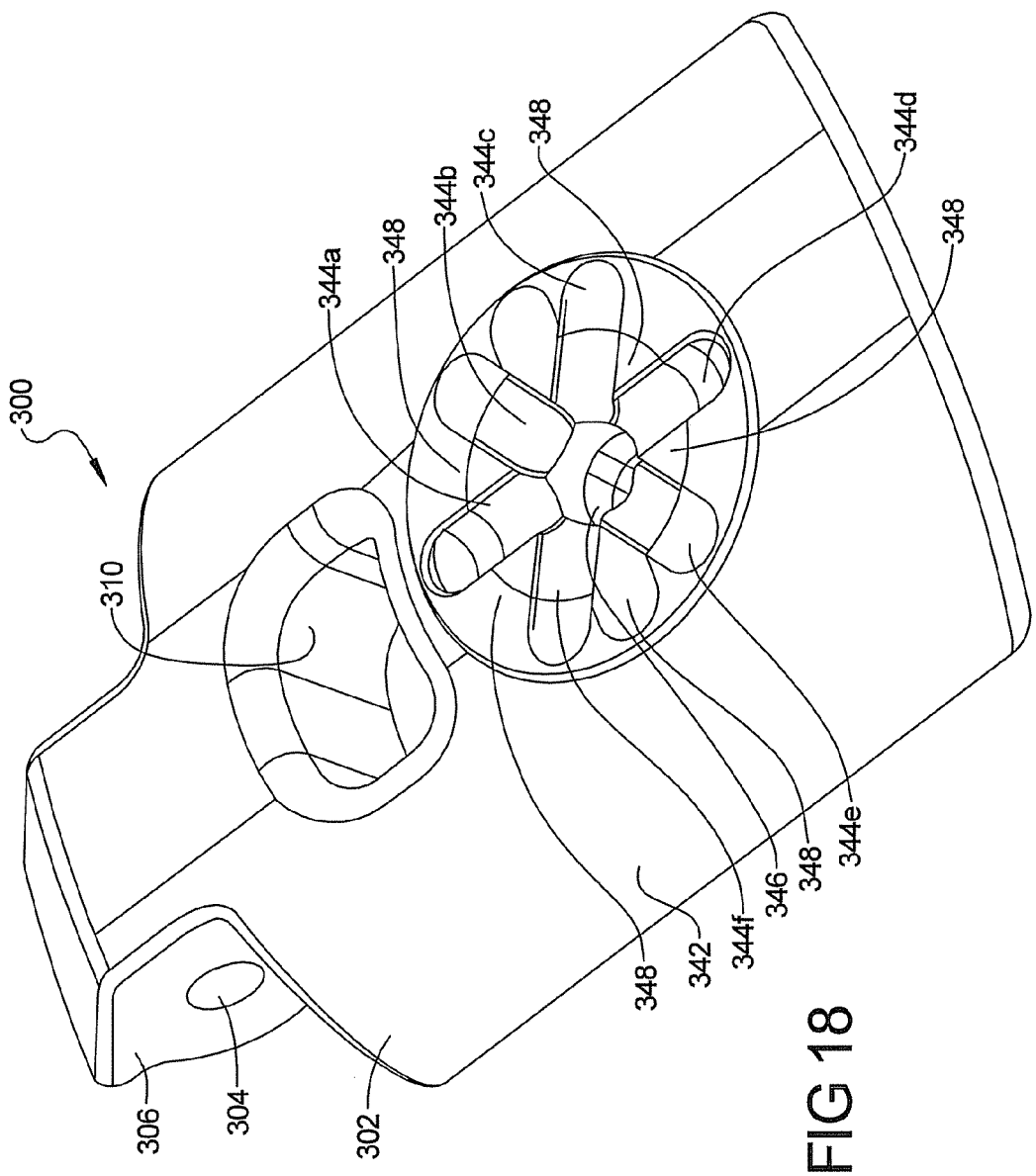
FIG. 18 is a perspective view of the end support of FIG. 15 but without the rotatable locking component secured thereto.

Referring to FIG. 18, the housing 302 is shown without the rotatable locking component 312 secured thereto. The housing 302 has an upper surface having a plurality of structural elements in the form of grooves 344a-344f that extend radially from a bore 346. The bore 346 extends completely through the housing 302 and has a diameter enabling the shaft portion 332 of the locking post 326 to reside therein and rotate without tangible play when the rotatable locking component 312 is secured to the housing 302. The grooves 344a-344f are also formed to have a semi-circular profile when viewed in cross-section, with each groove having a radius of curvature similar to the radius of the ball 340, and a depth sufficient to permit the ball 340 to rest at least partially therein while it is being biased by the internal spring of the ball plunger assembly 336. Areas 348 form flat surfaces upon which the lower surface 320 of the rotatable locking component 312 may rest and rotate smoothly over when being tightened or loosened.

While six grooves 344a-344f have been illustrated as being formed on the housing 302, it will be appreciated that a greater or lesser number of grooves could be formed. The total number of grooves 344 used will depend in large part on the diameter of the ball 340 that is being used in the ball plunger assembly 336, the diameter of the body portion 314, and the desired "resolution" that the rotatable locking component 312 will provide. By "resolution" it is meant the overall number of detents that the user will feel with each complete rotation of the rotatable locking component 312 as he/she tightens or loosens the component 312. It will also be appreciated that instead of grooves 344a-344f, it may be possible to implement a plurality of radially arranged, projecting ribs from the areas 348, and to have the ball 340 engage and be held stationary between adjacent pairs of the projecting ribs.

Figure 19:
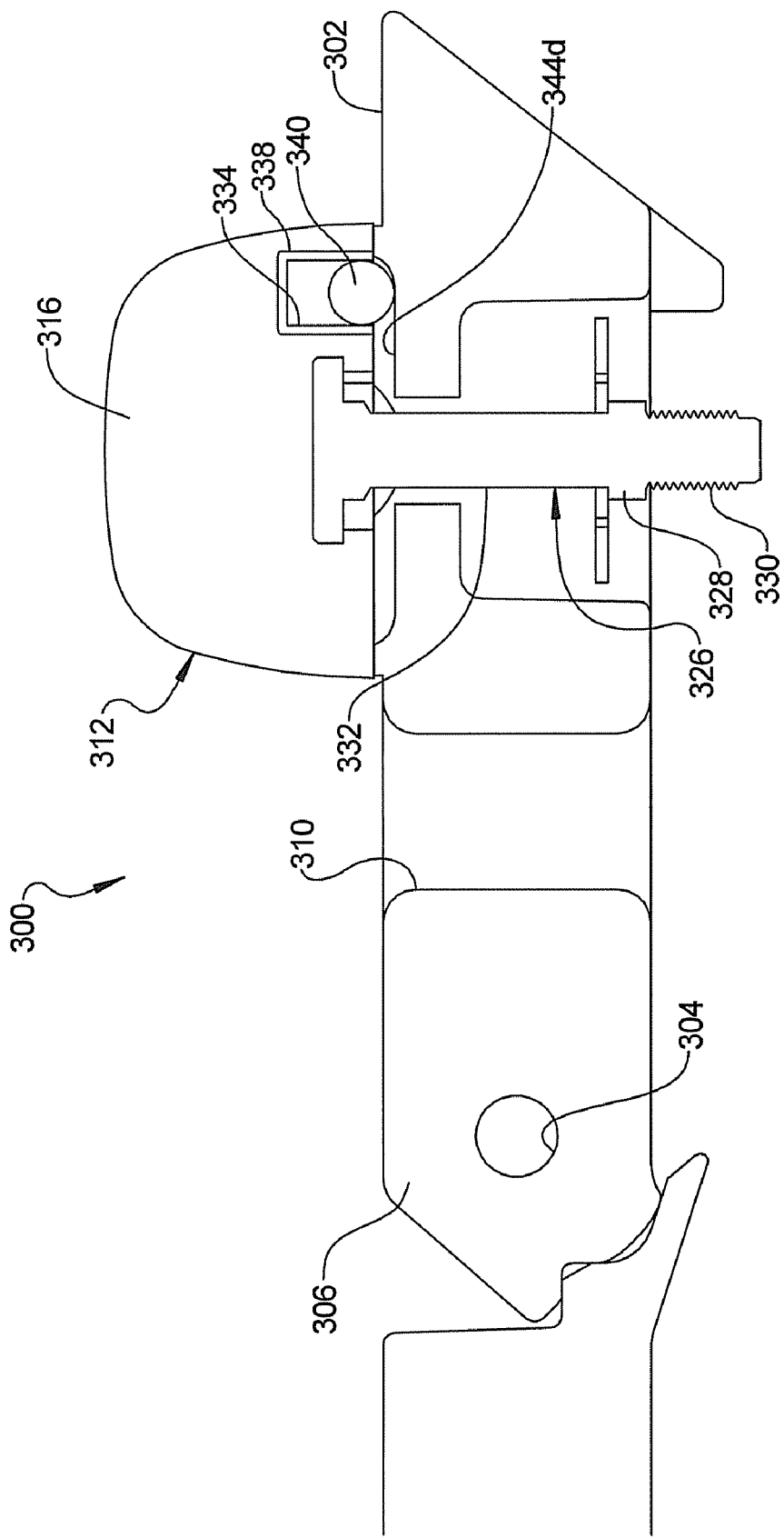
FIG. 19 is a side cross sectional view of the ball of the ball plunger assembly engaged in one of the radial grooves of the end support housing.
Figure 20:
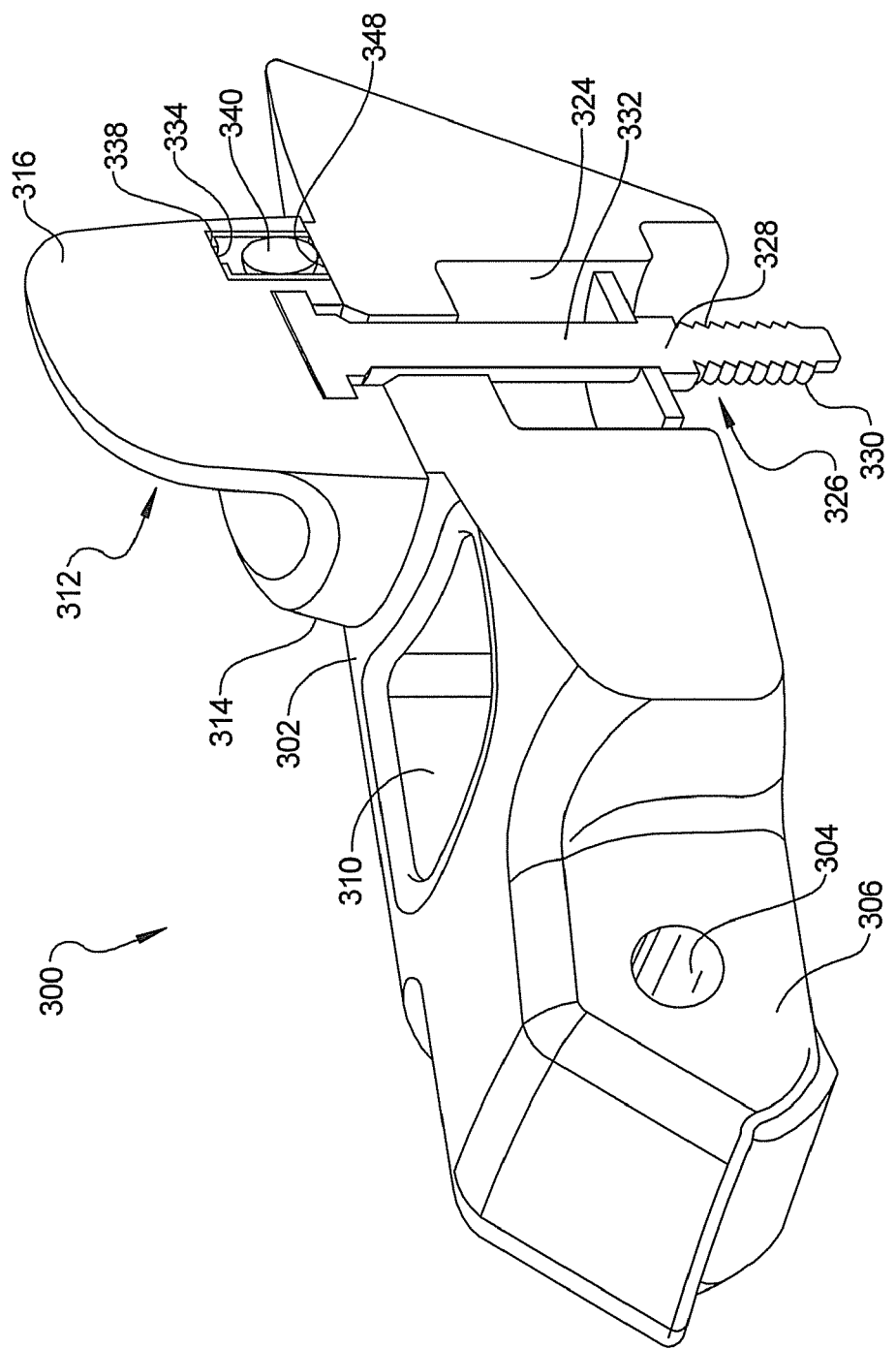
FIG. 20 is a side cross sectional view of the ball of the ball plunger assembly positioned between two adjacent grooves in the end support housing.

Referring to FIG. 19 the ball 340 of the ball plunger assembly 336 is shown positioned in groove 344a. It will be appreciated, then, that the grooves 344a-344f each also have a length that enables the ball 340 to be seated therein as the rotatable locking component 312 is rotated in clockwise and counterclockwise directions. The ball plunger assembly 336 provides a significant advantage in that it provides an additional holding force, once the rotatable locking component 312 has been tightened by a user, to help prevent the component 312 from loosening from the rotational position that the user left it at when the tightening operation was completed. This is significant because individuals with limited hand and/or arm strength may have difficulty applying sufficient rotational force to the rotatable locking component 312 to tighten it to a point where no reasonable chance of loosening of the component 312, under normal use conditions, would occur. When only a minimum tightening torque is applied, without the ball plunger assembly 336 and housing 302 construction described herein, there may be a risk of the locking component 312 "backing out" of its previously tightened condition during use of the article carrier system with which the end support 300 is being used. The end support 300 substantially eliminates this risk because of the additional holding force that the ball plunger 336 provides when its ball 340 is located in one of the grooves 344a-344f. The ball 340 is shown in FIG. 20 positioned between two adjacent ones of the grooves 344a-344f.

It will be appreciated that the ball plunger 336 provides a significant tactile "feel" as the ball 340 moves in and out the grooves 344a-344f when the user is rotating the rotatable locking component 312 in either a tightening direction or a loosening direction. Thus, the user can easily feel when the ball 340 has engaged within a particular one of the grooves 344a-344f.

To tighten the end support 300 to one of its associated support rails 16, the user simply grasps the raised portion 316 and rotates the rotatable locking component 312 in a predetermined direction, for example clockwise. The user will feel the ball 340 moving in and out of the grooves 344a-344f. The user rotates the rotatable locking component 312 until the user feels the component 312 has been sufficiently tightened, and also such that the user feels that the ball 340 has been seated in one of the grooves 344a-344f. If the user has applied the maximum rotational tightening force that he/she is able to apply, and senses that the ball 340 is not resting in one of the grooves 344a-344f, then the user may optionally loosen the component 312 a small amount until the user feels the ball 340 become seated in one of the grooves 344a-344f.

While the end support housing 302 has been described as having the grooves 344a-344f, and the rotatable locking component 312 as having the ball plunger assembly 336, it will be appreciated that the ball plunger assembly 336 could just as readily be carried in the housing 302. In such an alternative implementation the grooves 344a-344f would instead be formed on the lower surface 320 of the rotatable locking component 312. Both of these configurations are expected to be equally easily implemented in the end support 300.

The end support 300 thus provides an additional holding force to the rotatable locking component 312 once the component is tightened. The ball plunger assembly 336 is a relatively cost effective and easy to implement component that does not appreciably increase the cost, weight or complexity of construction of an end support. The end support 300 is especially useful for those individuals having limited hand strength.

While various embodiments have been described, those skilled in the art will recognize modifications or variations which might be made without departing from the present disclosure. The examples illustrate the various embodiments and are not intended to limit the present disclosure.

Therefore, the description and claims should be interpreted liberally with only such limitation as is necessary in view of the pertinent prior art.

What is claimed is:

1. A vehicle article carrier system adapted for use on an outer body surface of a vehicle to removably support articles above the outer body surface, the system comprising:

a pair of support rails adapted to be secured to the outer body surface generally parallel to one another, and extending along a major longitudinal axis of the vehicle;

at least one cross bar having dimensions sufficient to extend between the support rails when the support rails are secured to the outer body surface of the vehicle;

said cross bar having a central portion and a pair of end supports at opposite ends of said central portion, the end supports being pivotally secured to the opposite ends of the central portion;

the cross bar being supportable on top of a respective one of the support rails to lie generally flush on the respective one support rail, at a first elevation, when the cross bar is placed in a stowed position, and further such that the end supports extend generally along a longitudinal axis of the central portion of the cross bar;

the cross bar further being adapted to be secured to extend perpendicularly between the pair of support rails in an operative position, and when in the operative position each one of the end supports is secured to an associated one of the pair of support rails with the end supports being pivoted to extend non-parallel from the central portion of the cross bar, such that the central portion of the cross bar is elevated above the support rails and above the end supports;

each said end support having a housing and a rotatable locking component secured to the housing for rotatable movement, the rotatable locking component having a locking post with a threaded end portion adapted to threadably engage a portion of a support rail and to enable a threaded engagement between the threaded end portion and the portion of the support rail to provide a primary attachment force that secures the end support to the support rail;

one of the housing and the rotatable locking component having a biased implement projecting therefrom, and the other one of the housing and the rotatable locking component having a plurality of structural elements arranged in a circumferential pattern; and wherein the biased implement engages with at least one of the structural elements to provide an additional holding force to said rotatable locking component when said rotatable locking component has been tightened.

2. The system of claim 1, wherein the biased implement comprises a ball plunger system.

3. The system of claim 1, wherein the structural elements comprise grooves.

4. The system of claim 2, wherein the ball plunger system is supported in a surface of the rotatable locking component.

5. The system of claim 1, wherein the structural elements form a plurality of grooves that are arranged to extend radially around a bore in the housing of the rotatable component.

6. The system of claim 1, wherein the housing of the end support includes an opening formed therein for receiving a portion of an external fastening implement, to assist in securing an article to the cross bar associated with the end support.

7. A vehicle article carrier system adapted for use on an outer body surface of a vehicle to removably support articles above the outer body surface, the system comprising:

a pair of support raps adapted to be secured to the outer body surface generally parallel to one another, and extending along a major longitudinal axis of the vehicle;

at least one cross bar having dimensions sufficient to extend between the support rails when the support rails are secured to the outer body surface of the vehicle;

said cross bar having a central portion and a pair of end supports at opposite ends of said central portion, the end supports being pivotally secured to the opposite ends of the central portion;

the cross bar beings supportable on top of a respective one of the support rails to lie generally flush on the respective one support rail, at a first elevation, when the cross bar is placed in a stowed position, and further such that the end supports extend generally along a longitudinal axis of the central portion of the cross bar;

the cross bar further being adapted to be secured to extend perpendicularly between the pair of support rails in an operative position, and when in the operative position each one of the end supports is secured to an associated one of the pair of support rails with the end supports being pivoted to extend non-parallel from the central portion of the cross bar, such that the central portion of the cross bar is elevated above the support rails and above the end supports;

each said end support having a housing and a rotatable locking component secured to the housing for rotatable movement, the rotatable locking component having a locking post with a threaded end portion adapted to threadably engage a portion of a support rail and to enable a threaded engagement between the threaded end portion and the portion of the support rail to provide a primary attachment force that secures the end support to the support rail;

the rotatable locking component having a spring biased ball plunger projecting therefrom, and the housing having a plurality of structural elements arranged in a circumferential pattern; and wherein a ball of the spring biased ball plunger engages with at least one of the structural elements during rotation of the rotatable locking component to provide an additional holding force to said rotatable locking component when said ball is engaged with said structural elements.

8. The system of claim 7, wherein said rotatable locking component includes a manually graspable projecting portion to enable grasping engagement with a thumb and one or more fingers of an individual.

9. The system of claim 7, wherein the locking post includes a shoulder, the shoulder aiding in retaining the locking post to the rotatable locking component.

10. The system of claim 7, wherein said structural elements comprise a plurality of grooves formed in a surface of said housing of said end support.

11. The system of claim 10, wherein the grooves each have a circumferential wall having a radius of curvature similar to a radius of said ball of said spring biased ball plunger.

12. The system of claim 11, wherein:

the housing of each said end support includes a bore extending through the housing; and the grooves are formed to extend radially about the bore.

13. A vehicle article carrier system adapted for use on an outer body surface of a vehicle to removably support articles above the outer body surface, the system comprising:

a pair of support rails adapted to be secured to the outer body surface generally parallel to one another, and extending along a major longitudinal axis of the vehicle;

at least one cross bar having dimensions sufficient to extend between the support rails when the support rails are secured to the outer body surface of the vehicle;

said cross bar having a central portion and a pair of end supports at opposite ends of said central portion, the end supports being pivotally secured to the opposite ends of the central portion;

the cross bar being supportable on top of a respective one of the support rails to lie generally flush on the respective one support rail, at a first elevation, when the cross bar is placed in a stowed position, and further such that the end supports extend generally along a longitudinal axis of the central portion of the cross bar;

the cross bar further being adapted to be secured to extend perpendicularly between the pair of support rails in an operative position, and when in the operative position each one of the end supports is secured to an associated one of the pair of support rails with the end supports being pivoted to extend non-parallel from the central portion of the cross bar, such that the central portion of the cross bar is elevated to a second elevation above the support rails and above the end supports;

each said end support having a housing and a rotatable locking component secured to the housing for rotatable movement, the rotatable locking component having a spring biased ball plunger projecting therefrom, and said housing having a plurality of grooves formed in a surface thereof;

each said rotatable locking component includes a locking post fixedly secured thereto, and said locking post having a threaded end portion, for threadably engaging with a respective one of said support rails, to provide a primary attachment force to help secure its associated said end support to one of said support rails; and wherein a ball of the spring biased ball plunger engages with at least one of the grooves during rotation of the rotatable locking component to provide an additional holding force to said rotatable locking component when said ball is engaged with said one of the grooves.

14. The system of claim 13, wherein:

said housing of each said end support includes a bore formed therein through which said locking post projects; and wherein said grooves in said housing are formed to extend radially from said bore.

15. The system of claim 13, wherein said locking post includes a shoulder portion for assisting in retaining it to said housing of its associated said end support.

16. The system of claim 1, wherein said rotatable locking component includes a manually graspable projecting portion adapted to be grasped with a thumb and at least one finger of a user's hand.

17. The system of claim 13, wherein said spring biased plunger is selected to provide a predetermined holding force when said ball is engaged within one of said grooves.

18. A cross bar of a vehicle article carrier system having a pair of support rails secured on an outer body surface thereof, the cross bar comprising:

a central portion having opposing end portions;

a pair of end supports pivotally secured to the opposing end portions, the end supports enabling:

the cross bar to assume a first configuration where the end supports are positioned generally longitudinally in line with the central portion to facilitate stowage of the cross bar on one of the support rails; and the cross bar to assume a second configuration in which the end supports extend non-parallel to the central portion to place the central portion in an elevated position relative to the end supports when the cross bar is placed in an operative position extending perpendicularly between, and supported by, the support rails;

a housing and a manually graspable, rotatable locking component secured to the housing for rotatable movement relative to the housing;

the locking component having a locking post with a threaded end portion adapted to threadably engage a portion of a support rail and to enable a threaded engagement between the threaded end portion and the portion of the support rail to provide a primary attachment force that secures the end support to the support rail;

one of the housing and the rotatable locking component having a spring biased implement projecting therefrom, and the other one of the housing and the rotatable locking component having a plurality of structural elements arranged in a circumferential pattern; and wherein the biased implement engages with at least one of the structural elements to provide an additional holding force to said rotatable locking component when said rotatable locking component has been tightened.

* * * * *